United States Patent
Potocnik et al.

(10) Patent No.: US 12,450,232 B2
(45) Date of Patent: Oct. 21, 2025

(54) DYNAMIC WORKLOAD MANAGEMENT OPTIMIZATIONS USING REAL-TIME EXECUTION FEEDBACK

(71) Applicant: Microsoft Technology Licensing, LLC, Redmond, WA (US)

(72) Inventors: Milan Potocnik, Seattle, WA (US); Sumeet Priyadarshee Dash, Lake Forest, CA (US); Jose Aguilar Saborit, Bellevue, WA (US); Krishnan Srinivasan, Sammamish, WA (US); Raghunath Ramakrishnan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/477,234

(22) Filed: Sep. 28, 2023

(65) Prior Publication Data

US 2024/0394255 A1    Nov. 28, 2024

Related U.S. Application Data

(60) Provisional application No. 63/503,958, filed on May 23, 2023.

(51) Int. Cl.
*G06F 16/2453* (2019.01)
*G06F 9/48* (2006.01)

(52) U.S. Cl.
CPC ...... *G06F 16/24545* (2019.01); *G06F 9/4881* (2013.01); *G06F 16/24532* (2019.01)

(58) Field of Classification Search
CPC ......... G06F 16/24545; G06F 16/24532; G06F 9/4881
USPC ......................................................... 707/720
See application file for complete search history.

(56) References Cited

U.S. PATENT DOCUMENTS

| | | | |
|---|---|---|---|
| 8,516,488 B1 * | 8/2013 | Brown | G06F 9/5038 707/718 |
| 8,966,493 B1 * | 2/2015 | Richards | G06F 9/4887 718/104 |
| 11,061,898 B2 * | 7/2021 | Hwang | G06F 16/24542 |
| 11,330,043 B2 * | 5/2022 | Kumar | H04L 67/1021 |
| 11,893,014 B2 * | 2/2024 | Arnold | G06F 16/8365 |
| 2019/0272271 A1 * | 9/2019 | Bhattacharjee | G06F 16/2471 |
| 2019/0310977 A1 * | 10/2019 | Pal | G06F 9/5077 |

* cited by examiner

*Primary Examiner* — Joshua Bullock
(74) *Attorney, Agent, or Firm* — Barta Jones, PLLC (57) ABSTRACT

Systems and methods are provided that introduce an approach for executing a multi-query workload that leverages live execution feedback from nodes to detect resourcing issues and anomalies, and deploy real-time corrective measures for the multi-query workload. Leveraging live execution feedback from the nodes as the queries are executing make it possible to detect various resourcing issues and anomalies, and enable the system to perform corrective actions "live" or in "real-time" during an execution of a query, and more specifically during execution of the tasks within a query.

20 Claims, 5 Drawing Sheets

DYNAMIC WORKLOAD MANAGEMENT OPTIMIZATIONS USING REAL-TIME EXECUTION FEEDBACK

CROSS-REFERENCE TO RELATED APPLICATION

This application claims priority to U.S. Provisional Patent Application No. 63/503,958, entitled "DYNAMIC WORKLOAD MANAGEMENT OPTIMIZATIONS USING REAL-TIME EXECUTION FEEDBACK," filed on May 23, 2023, the disclosure of which is incorporated herein by reference in its entirety.

BACKGROUND

Resource management and scheduling are two fundamental aspects of workload management in any query processing system. Autonomous workload management is a complex problem in any distributed Big Data Analytics services. Autonomous workload management requires a system to be able to predict resource needs of a multi-query workload as well as executing it by allocating optimal resources to each query in the multi-query workload across nodes in a compute cluster to achieve best performance.

Estimate driven workload managers produce query estimates based on available statistics about data distribution; however, the estimate driven workload managers are only be as good as the estimates. For example, underestimation leads to bad performance and overestimation leads to increased operational cost and may result in reduced concurrency if there is a cap on capacity growth. The estimates might be off due to bad quality statistics or incorrect assumptions about the data distribution. Further, nodes could go "bad" either due to noisy neighbor issues or infra problems. Thus, the system may experience anomalies for a variety of reasons, such as, a task might be stuck on one of the compute nodes preventing new tasks from getting scheduled or a node might be spilling to disk more than others. In a compute cluster, performance is bottlenecked by the slowest node. As such, detecting such issues and addressing them is key to ensuring optimal workload performance.

SUMMARY

The disclosed examples are described in detail below with reference to the accompanying drawing figures listed below. The following summary is provided to illustrate some examples disclosed herein.

Example solutions include a method for adjusting resources during execution of a query comprising: receiving a query; identifying a plurality of tasks to execute the query, the plurality of tasks comprising a first task and a second task that depends from the first task; providing a first estimation of a first amount of resources to be used to execute the first task; providing a second estimation of a second amount of resources to be used to execute the second task; based at least on the first estimation and the second estimation, assigning the first task to a first node and the second task to a second node; and prior to the second task on the second node being executed: receiving, from the first node, an actual amount of resources used to execute the first task; and based at least on the actual amount of the resources used to execute the first task, adjusting the second estimation of the second amount of resources to be used to execute the second task.

Additional example solutions include a system for adjusting resources during execution of a query comprising: a distributed query processor; a query optimizer; a cluster of nodes, the cluster of nodes comprising a first node and a second node; a memory comprising computer-readable media that, when executed by the distributed query processor, cause the distributed query processor to perform the following operations: receiving a query; identifying a plurality of tasks to execute the query, the plurality of tasks comprising a first task and a second task that depends from the first task; receiving, from the query optimizer, a first estimation of a first amount of resources to be used to execute the first task; receiving, from the query optimizer, a second estimation of a second amount of resources to be used to execute the second task; based at least on the first estimation and the second estimation, assigning the first task to the first node and the second task to the second node; and prior to the second task on the second node being executed: receiving, from the first node, an actual amount of resources used to execute the first task; and based at least on the actual amount of the resources used to execute the first task, adjusting the second estimation of the second amount of resources to be used to execute the second task.

Additional example solutions include computer-readable media comprising computer-executable instructions that, when executed by a processor, cause the processor to perform the following operations: receiving a query; identifying a plurality of tasks to execute the query, the plurality of tasks comprising a first task and a second task that depends from the first task; providing a first estimation of a first amount of resources to be used to execute the first task; providing a second estimation of a second amount of resources to be used to execute the second task; based at least on the first estimation and the second estimation, assigning the first task to a first node and the second task to a second node; and prior to the second task on the second node being executed: receiving, from the first node, an actual amount of resources used to execute the first task; and based at least on the actual amount of the resources used to execute the first task, adjusting the second estimation of the second amount of resources to be used to execute the second task.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale. Any of the drawings may be combined into a single embodiment or example.

DETAILED DESCRIPTION

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Within any query processing system, resource management and scheduling represent essential components of workload management. In distributed Big Data Analytics services, achieving autonomous workload management is a challenging task. This entails the system's capability to anticipate or approximate the resource requirements of a workload involving multiple queries. The system must then efficiently distribute optimal resources to each query within the multi-query workload across the nodes of a computing cluster in order to attain the highest level of performance.

Conventionally, estimate driven workload managers, while having acceptable performance in many instances, suffer from an inherent flaw and heavily rely on the accuracy of the provided estimates. For example, if there is an underestimation of resource needs, this can lead to subpar performance, while overestimation can result in higher operational costs and potentially reduced concurrency, particularly if there's a cap on capacity growth. In conventional systems, inaccurate estimates may stem from unreliable statistics or incorrect assumptions about data distribution. For example, a partitioned dataset might exhibit data skew due to uneven distribution, while estimates assume uniformity. Additionally, the actual usage of a compute cluster may differ significantly from its perceived utilization. Nodes may encounter issues due to problems like noisy neighbors or infrastructure issues. Moreover, conventional systems may face other anomalies for various reasons. The slowest node in the cluster can act as a bottleneck for overall performance. This means a task for a query could be stalled on a node, preventing the scheduling of new tasks. Furthermore, a node might experience higher disk usage compared to others in the cluster. Detecting and rectifying these issues is crucial for achieving optimal workload performance.

The cloud-based architecture described herein addresses the technical problems posed by conventional resource estimate driven workload systems. That is, the present disclosure provides systems and methods that introduce an approach for executing a multi-query workload that leverages live execution feedback from nodes to detect resourcing issues and anomalies, and deploy real-time corrective measures for the multi-query workload. By leveraging live execution feedback from the nodes as the queries are executing, the aspects of the present disclosure improve upon conventional systems and methods by making it possible to detect various resourcing issues and anomalies, and enable the system to perform corrective actions "live" or in "real-time" during an execution of a query, and more specifically during execution of the tasks within a query. In some examples, a Query Optimizer (QO) is responsible for producing query resource need estimates based on available statistics about data distribution and a distributed query processor (DQP) is responsible for optimizing and coordinating the execution of queries across the nodes in the compute cluster.

That is, while a task is being executed by a node and/or after a task is executed by a node, the node provides the DQP and/or QO feedback that informs the DQP and/or the QO about relevant actual execution data enabling the DQP and/or the QO to make adjustments in real-time. As such, the DQP and/or the QO can adjust the resource allocation and/or resource expectation for a task, a query, and even the workload while the tasks/queries within the workload are being executed. As such, the feedback from each of the nodes becomes an integral part of a distributed query processing pipeline.

Thus, the present disclosure provides a technical solution to the technical problem of accurately estimating resource consumption of a workload. In the same manner, the present disclosure provides numerous technical effects including, but not limited to, increasing processing speed due to the adjustments to resource allocations made in real time and/or during execution of a query, improved elasticity and scalability due to each node providing real time execution data enabling the distributed query processor to increase or decrease the number of nodes/resources used to execute a workload, enabling only the nodes resources required for processing the workload to be used so that a user is charged only for the work being performed, rather than theoretical capacity or consumption that may or may not be used or needed.

Figure 1:
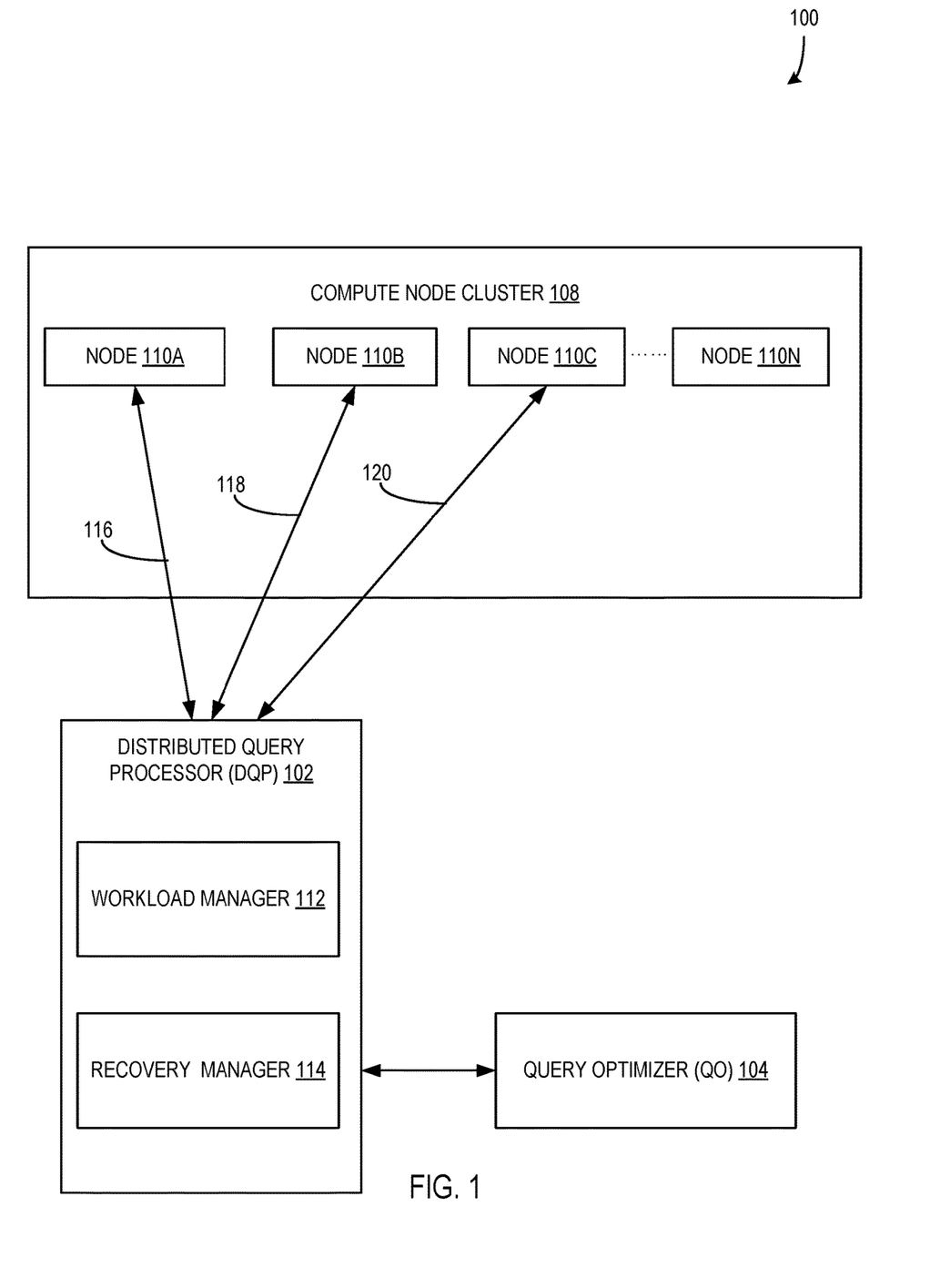
FIG. 1 is a block diagram illustrating an example system for providing dynamic workload management optimization using real-time execution feedback.

FIG. 1 illustrates an example system 100 for providing dynamic workload management optimization using real-time execution feedback. A DQP 102 in the system 100 may be referred to as distributed cloud processor, a distributed plan executor, or a distributed plan orchestrator. The DQP 102 executes the steps, or transaction tasks, to solve, or execute, a query. For example, the DQP 102 determines a quantity of nodes, for example, nodes 110A-110N that are added to a cluster 108 of nodes that are to perform the transaction tasks. As described in further detail below, each node in the cluster 108 has a resource capacity and thus the cluster 108 has a collective capacity from each of the nodes within the cluster 108. The DQP 102 includes a workload manager 112 that manages the nodes 110A-110N. For example, the workload manager 112 determines which transaction tasks to assign to which nodes 110A-110N, taking into account dependencies, capacity, the number of nodes 110A-110N available, and so forth.

In some examples, the DQP 102 generates a topology map that maps the nodes 110A-110N in the cluster 108 used to process each transaction task of a particular distributed transaction. The topology map may be used so that, in the case of failure, a recovery manager 114 is able to propagate back to a completed version and re-assign transaction tasks to nodes the 110A-110N in order to ensure the transaction tasks are completed. In some examples, the topology map is a hypergraph, where the nodes represent the tasks and maps the dependencies of one transaction task to another and one node to another.

Figure 2:
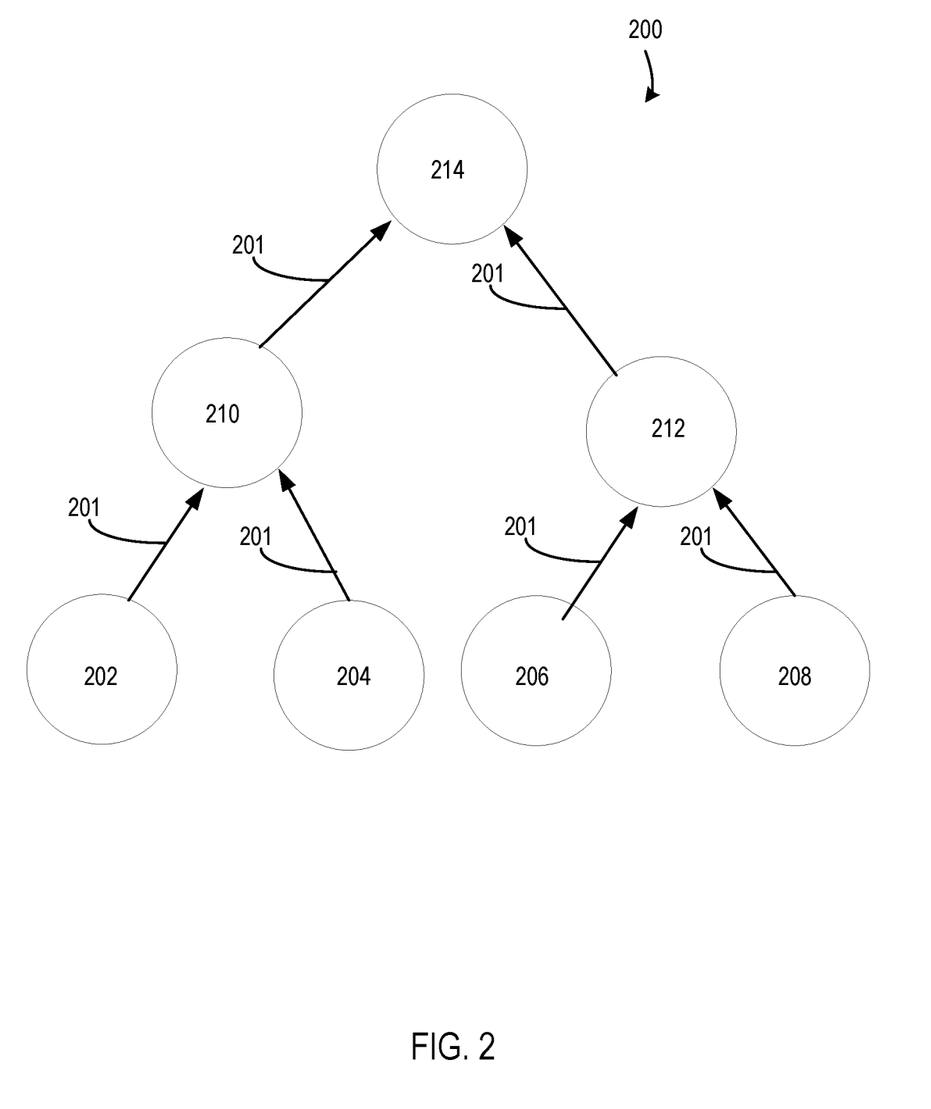
FIG. 2 illustrates an exemplary query graph.

In some examples, the workload management is the responsibility of the DQP 102. A query optimizer (QO) 104 receives and processes an incoming query. The QO 104 produces an optimal plan which is structured as a dependency graph (e.g., query graph 200 as shown in FIG. 2). Each of the vertices shown in FIG. 2 is a distributed operator, such as distributed operators 202-214, that are tasks of a query and these tasks come with an estimated resource demand expressed as 3-dimensional vector consisting of a central processing unit (CPU) cost (e.g., number of cores), a memory cost (e.g., bytes of memory), and a disk cost (e.g., bytes of disk). As described herein, a distributed operator (e.g., the distributed operators 202-214) can be seen as a task of a query requiring instantiation across one or more nodes for executing the distributed operator. For example, each of the distributed operators 202-214 include a DistributedDegree of Partitioned Parallelism (DOPP), which governs the number of computes nodes (e.g., the maximum number) each task can be executed on (e.g., how many partitions of parallelism it has). For example, if the DOPP of a task is 10, the task can run/be executed on 10 compute nodes (e.g., nodes 110A-110N) in parallel and the task is instantiated on 10 compute nodes. However, each compute node has a resource capacity and each task (to be executed on the compute node) has resource requirements (e.g., capacity cost). Thus, if a particular task has as a CPU cost of 10, a memory cost is 10, and a disk cost of 10, shown as [10,10,10] (meaning it will consume 10 CPU and 10 memory and produce/output 10 disk), but each compute node has a capacity of 5 CPU, 5 memory, and 5 disk, then two compute nodes are needed to execute the particular task. As such, when the DOPP of a particular task is 10 indicating that the task can be run in parallel on 10 different compute nodes, based on a capacity of available compute nodes, the task may only be run on 5 compute nodes in parallel. While the CPU cost, the memory cost, and the disk cost are shown in these examples as small integers, these integers may be much higher or expressed as decimal values.

In another example, a task may have a DOPP of 2, with CPU cost, memory cost, and disk cost of [2,2,2], and two available compute nodes have a capacity of [5,5,5], the DQP 102 schedules the task to be executed on the two available compute nodes, each of the two available compute nodes being responsible for [1,1,1] of the task, which collectively equals the required [2,2,2]. That is, [1,1,1]+[1,1,1]=[2,2,2]. In addition, the DPQ 102 updates the bookkeeping given that the capacity of each of the two available compute nodes has now decreased from [5,5,5] down to [4,4,4] after the task is scheduled on each. As such, each of the two available compute nodes are now shown to have a capacity (of [4,4,4]) to execute additional tasks as needed.

When the DQP 102 schedules tasks on various compute nodes, the resource cost assigned to each task is merely an estimated cost. Thus, the scheduling of the tasks on various compute nodes are based on these estimates, but when the tasks are actually executed, real time feedback is received by the DQP 102, which may indicate the estimated resource costs were off and need to be updated. For example, in the example described above, the particular task had an estimated resource cost of [2,2,2], which was assigned to the two available compute nodes, each of the available compute nodes being responsible for [1,1,1] of the task resource costs. However, when the task is executed on each of the available compute nodes, it is determined that the actual resource costs was [2,2,2] when executed on a first one of the available compute nodes while processing the first partition of input data and was [3, 3, 3] on a second one of the available compute nodes while processing the second partition of input data. While the assumption that each instance of the task consumes a same amount of resources when processing a partition of the input dataset, live feedback allowed detection of heterogeneity among the partitions, that is, feedback is partition aware.

That is, instead of the estimated resource cost of [1,1,1,], the task consumed 2 CPU, 2 memory and output 2 disk on the first available compute node, and instead of the estimated resource cost of [1,1,1], the task consumed 3 CPU, 3 memory and output 3 disk on the second available compute node. This real time feedback is then used by the DQP 102 to update the estimated resource consumption of the parent compute node. For example, prior to the child operator/task being executed by each of the participating compute nodes (e.g., the first and second available compute nodes), the DQP 102 estimated that the parent operator/task would have a resource cost (based on the task being executed) of [3,3,3]. However, it is now known that the executed task resulted in more resource cost than originally estimated, and in particular, [3,3,3] more than originally estimated. Thus, the DQP 102 uses this information to increase the estimated consumption of CPU and memory of the parent from 3 CPU and 3 memory, to 6 CPU and 6 memory. The cost adjustments described herein (e.g., by a factor of 2) are merely exemplary as the adjustments applied can be a function of the computational complexity of a particular operator and the costs of different operators can be adjusted differently. The DQP 102 does not update the estimate for the disk in this example, only the CPU and memory. Upon execution of the task by the parent, the disk output is updated, and this update will not initially reflect the actual output, but also the actual consumption (which may be more, less, or equal to the estimated consumption) to then be used by the DQP 102 to provide updates to additional nodes (e.g., grandparents) as needed.

Further, as a child operator produces a partitioned result set to be consumed by its parent operator, the feedback collected at the end of the child operator execution provides the exact size of each output partition. Further, while the aggregate feedback collected for each child operator allows the DQP 102 to appropriately adjust an overall cost of the parent operator, the aggregate feedback also allows the DQP 102 to split the operator cost unevenly among the input partitions based on a size of each partition.

In the cited example, the adjusted cost of the parent operator is 6 CPU and 6 memory. Thus, if the parent operator's DOPP is 2, meaning its input (also the output from its children) has 2 partitions, the DQP 102 is enabled to reserve [2, 2] on a first node that is assigned the first partition and [3, 3] on a second node that is assigned the second partition without splitting the cost 50-50.

Figure 3:
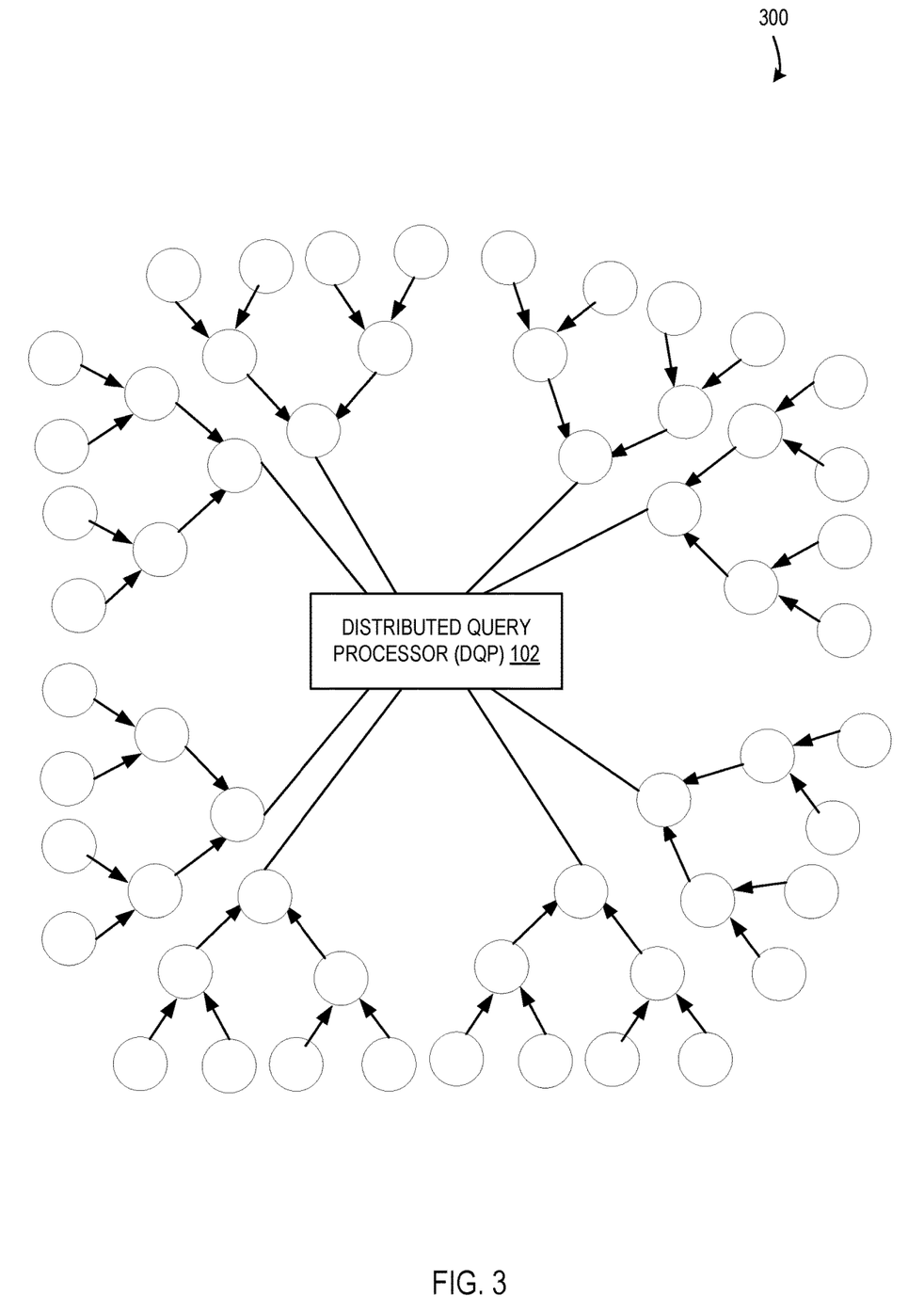
FIG. 3 illustrates an exemplary global query graph.

With reference back to FIG. 2, the distributed operators 202-214 connected by an edge (e.g., edges 201) share a producer-consumer relationship with a dependency constraint. When a producer operator, such as the distributed operators 202-212, runs, it unblocks all its consumer parents to process the data it generates. The root operator, such as the distributed operator 214, produces a final result set. Leaves (e.g., the distributed operators 202-208) are scan operators without any children/dependencies and they read data from a remote storage. Each instance of a task of the query processes a partition of an input dataset. The overall workload, which is composed of 'N' queries, is represented as a hyper workload graph which combines all query graphs into a single large collection of tasks as shown in FIG. 3.

With continued reference to FIG. 2 and further to the example described above, if a child operator's (e.g., the distributed operator 210) actual resource requirements (discovered during execution of the child operator) do not match the estimated values, the parent (dependent) operator (e.g., the distributed operator 202) has to process a different amount of data than was originally estimated for the parent. In some examples, and as explained previously, the DQP 102 adjusts the parent operator's resource tasks based on the actual execution stats of the children distributed operators consumption and output.

The actual input data size and cardinality, calculated as a function of the collective output from all the dependencies to be processed by a parent distributed operator, are used by the DQP 102 to adjust the estimated resourcing for each partition of the parent distributed operator. In other words, each input partition data size and cardinality are known before the parent distributed operator begins execution.

For example, each of the distributed operators 202-214 provide information to the DQP 102 during (and after)

execution. This information is provided as feedback and is provided to the DQP 102 using a dedicated communication channel (e.g., one of the dedicated communication channels 116-120). In one example, the dedicated channels are established using the gRPC communication framework. The feedback represents relevant lightweight runtime execution information that is sent back to DQP 102 via dedicated communication channels (e.g., the dedicated communication channels 116-120) from the compute nodes (e.g., nodes 110A-110N) participating in the execution of a task. This information provided by each of the distributed operators includes one or more of the following: backend task execution statistics, stats on data transferred between nodes when executing a task, and since task execution is distributed across multiple nodes, data transferred for each partition is available.

Feedback can be sent at the completion of each task, or it can be live, sent periodically as the task is executing. Separately, the DQP 102 can periodically collect real-time machine-level stats from the compute nodes (e.g., the nodes 110A-110N) to assess a load on individual nodes using the same feedback channels. Such information is used as a valuable tool for detecting anomalies. For example, it may be determined that a distributed operator needs to be rescheduled. In this example, previous runtime feedback can be used to accurately update a resourcing of the distributed operator. In some other examples, the query can be stopped altogether and the QO 104 is informed to recompile the query with new verified assumptions.

With live feedback flowing in from the distributed operators 202-214 when each of the distributed operators 202-214 are executing, a determination can be made with respect to whether a backend task is making progress or not, based on, for example, run time metrics criteria. For example, a task instance might be experiencing increased lock contention or IO throttling when reading from the remote storage on one of the nodes and the real time feedback provided by the distributed operators 202-214 as they execute provided data that enables the DQP 102 to determine these issues. This, in turn, can be used to cancel and retry the task with different resourcing/scheduling policies. If a compute node has become a 'hotspot', it can be backed up by instantiating a secondary replica or we can alleviate the load by redistributing the input partitions. The DQP 102 auto scales the compute cluster to acquire enough compute nodes to run the workload performantly without resourcing waits. When an operator is unblocked to run, DQP allocates resources based on the estimates. The sum of the demands from all operators currently resourced to run cannot exceed available capacity.

Figure 4:
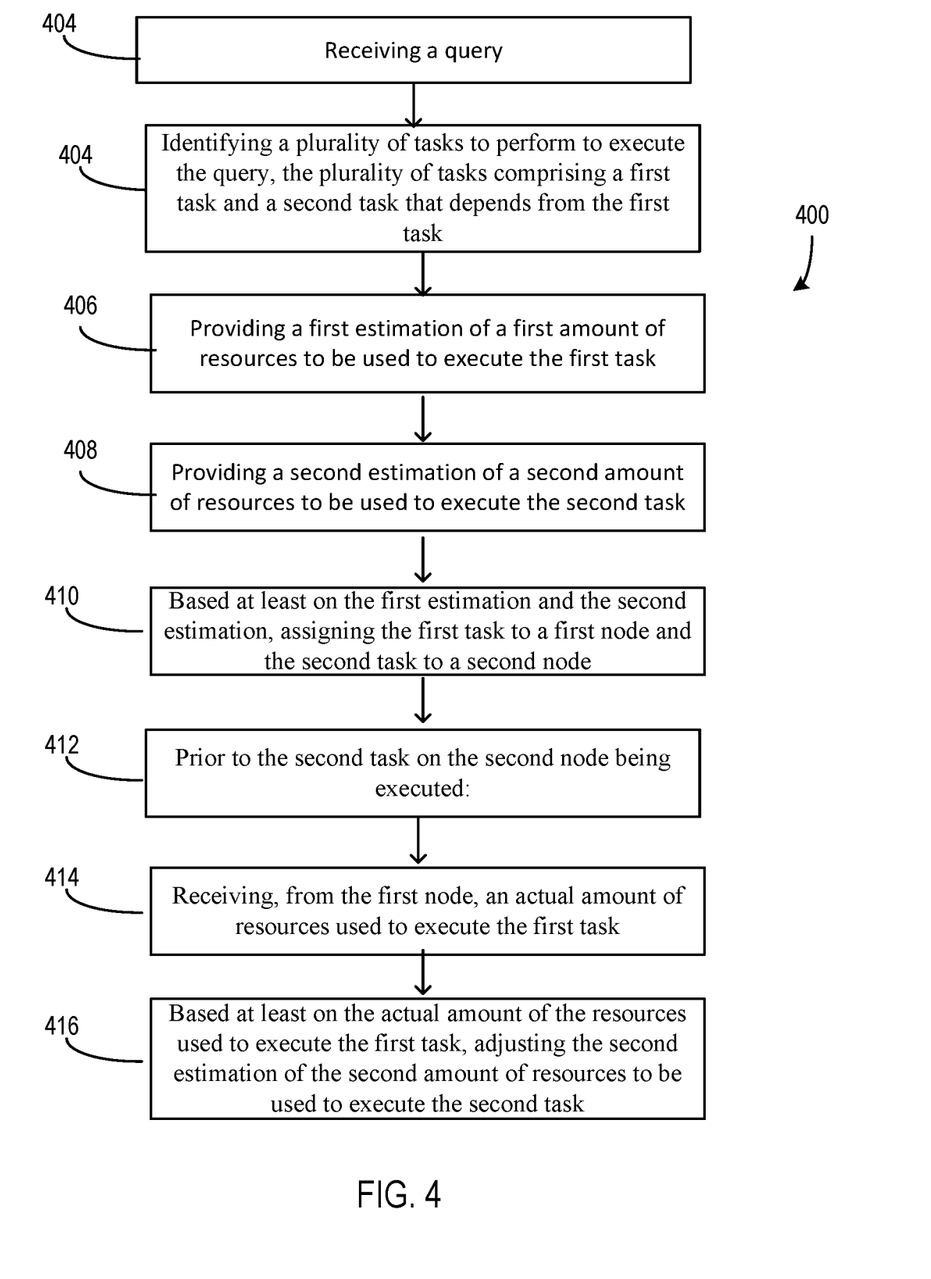
FIG. 4 is an example flowchart illustrating a computer-implemented examples of the present disclosure.

With reference now to FIG. 4, a flowchart illustrating an exemplary method for providing summarization of content from a website based on an inference from a user's query is described. At 402, a query from a workload is received by the DQP 102 and/or the QO 104. The query is one of a plurality queries that make up the workload. At 404, a plurality of tasks (e.g., distributed operators) are identified from the query to execute the query. While the received query can include hundreds of tasks, the example provided herein identifies a first task and a second task, wherein the second task depends from the first task. That is, the second task cannot execute before the first task has completed execution. At 406, a first estimation of a first amount of resources to be used to execute the first task is provided by, for example, the QO 104. In some examples, each task in the plurality of tasks has a resource demand comprising: a central processing unit demand, a memory demand, and a disk demand. In some examples, the resource estimation of one CPU, one memory, and one disk can be represented by [1,1,1], and a resource estimation of two CPU, two memory, and three disk can be represented by [2, 2, 3]. In some examples, the CPU and Memory are what the task consumes and the disk represents an output (e.g., that is received by a dependent task, such as the second task). At 408, a second estimation of a second amount of resources to be used to execute the second task is provided by, for example, the QO 104. At 410, based at least on the first estimation and the second estimation, the first task is assigned to a first node and the second task is assigned to a second node. In some examples, each of the first node and the second node have a resource capacity comprising: a central processing unit capacity, a memory capacity, and a disk cost capacity. As such, assigning a task to each node is based on a combination of resource demand of the task and a resource capacity for the nodes. In addition, the DQP 102 or the QO 104 identifies a degree of parallelism for each task, where the degree of parallelism indicates how many different nodes the first task can be executed on, and based on the identifying, the first task in this example is assigned to the first node (e.g., if the degree of parallelism is one) or assigning the first task to the first node and one or more other nodes (e.g., if the degree of parallelism is greater than one). For example, if the degree of parallelism for the first task is determined to be ten, then the first task can be executed in parallel on ten separate nodes. In some example, based on the resource demand of the first task and resource capacity of the nodes, the first task is not spread equally among ten different nodes, and instead, the ten "sub-tasks" are assigned to less than ten nodes, for example, three on one node, two on one node, and five on five different nodes, based on the partitions in each of the nodes (e.g., each partition of a node executes one of the sub-tasks). In some examples, the number of sub-tasks assigned to each node is based on a time each sub-task takes to execute. That is, the division of the sub-tasks is based on the desire to have each node execute their assigned tasks at around the same time so there is no stall or waiting incurred by the dependent tasks in the graph.

At 412, prior to the second task on the second node being executed, an actual amount of resources used to execute the first task is received from the first node at 414, and based at least on the actual amount of the resources used to execute the first task, the second estimation of the second amount of resources to be used to execute the second task is adjusted at 416. In some example, the actual amount of resources used to execute the first task is different than the first estimation of the first amount of resources. For example, the actual amount of resources used to execute the first task may be more that what was estimated in the first estimation, or the actual amount of resources used to execute the first task may be less that what was estimated in the first estimation. For example, the first estimation of resources may have been [1, 1, 1]; however, after execution of the first task, the first node provides the DQP 102 with information indicating that the actual amount of resources used to execute the first task was [2, 2, 2]. Thus, since the first task used more resources that originally estimated, the DQP 102 adjusts the second assumption of resources for the second task since the second task depends from the first task. That is, since the first task used more resources than estimated, the second task (which receives the output from the first task) will also use more resources. Thus, if the second estimation of resources for the second task was [2,2,2], after the DQP 102 receives the actual amount of resources used (e.g., [2,2,2], the DQP 102 adjusts the second estimation to be [3,3,2]. In some examples, only the CPU and memory are adjusted. In other examples, the DQP 102 adjusts each of the CPU, the memory, and the disk. Thus, in some examples, adjusting the second estimation of the second amount of resources includes one of the following: increasing the second amount of resources in the second estimation when the actual amount of resources used to execute the first task is greater than the first estimation of the first amount of resources, or decreasing the second amount of resources in the second estimation when the actual amount of resources used to execute the first task is less than the first estimation of the first amount of resources. In some examples, the actual amount of resources used to execute the first task is provided in real-time from the first node using a dedicated communication channel coupled to the DQP 102. In some examples, each task (e.g., each of the first task and the second task) has its own correction function and the QO 104 can apply the correction function for the respective task to determine how much to increase (in the case of the estimation being lower than the actual amount of resources used) or to decrease (in the case of the estimation being greater than the actual amount of resources used) the estimated resources for a dependent task.

Exemplary Operating Environment

Figure 5:
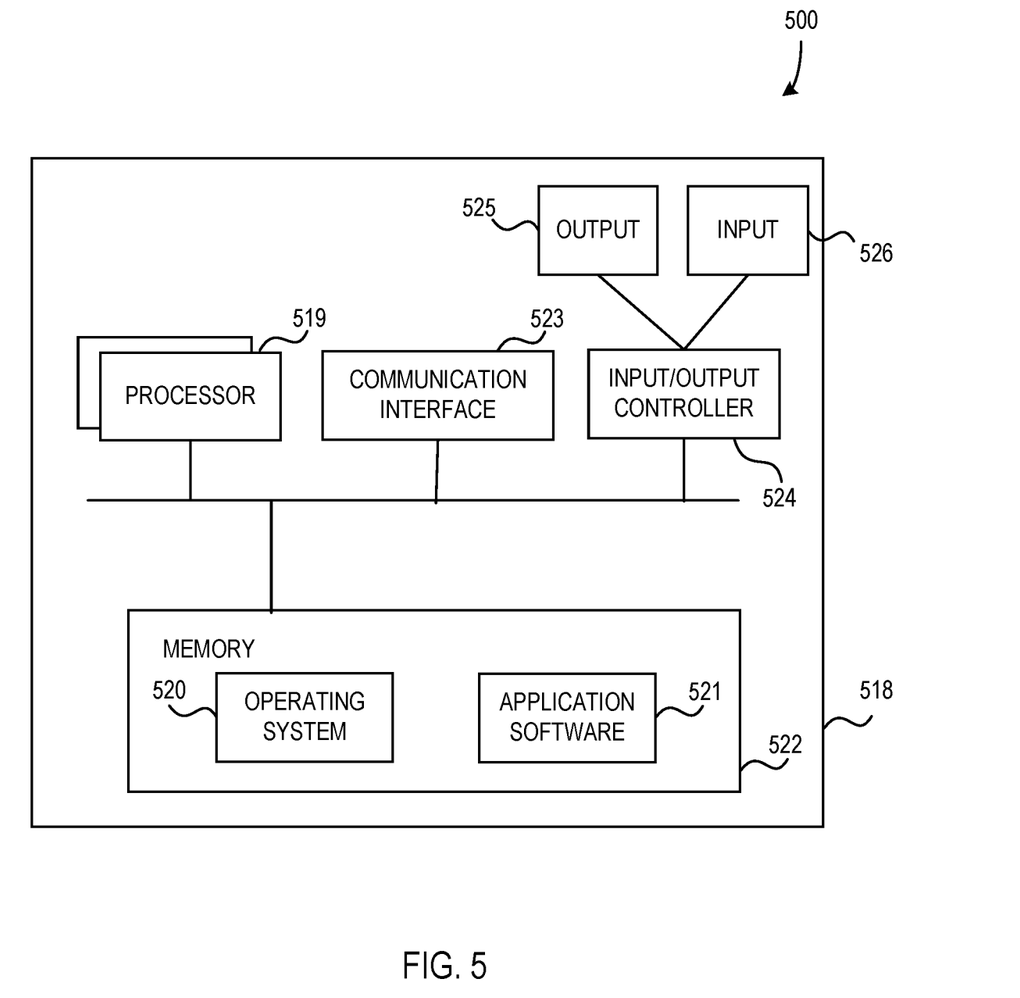
FIG. 5 is a block diagram of an example computing device for implementing examples of the present disclosure.

The present disclosure is operable with a computing apparatus according to an example as a functional block diagram 500 in FIG. 5. In an example, components of a computing apparatus 518 may be implemented as a part of an electronic device according to one or more examples described in this specification. For example, the computing apparatus 518 can include the distributed query processor 102 illustrated in FIG. 1 and/or a computing device controlling/interacting remotely with the distributed query processor 102. The computing apparatus 518 comprises one or more processors 519 which may be microprocessors, controllers, or any other suitable type of processors for processing computer executable instructions to control the operation of the electronic device. Alternatively, or in addition, the processor 519 is any technology capable of executing logic or instructions, such as a hardcoded machine. Platform software comprising an operating system 520 or any other suitable platform software may be provided on the apparatus 518 to enable application software 521 to be executed on the device.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g., using a communication interface 523).

In some examples, the computer-readable media includes instructions that, when executed by the processor 519, execute instructions for the DQP 102 and the QO 104. The computing apparatus 518 may comprise an input/output controller 524 configured to output information to one or more output devices 525, for example a display or a speaker, which may be separate from or integral to the electronic device. For example, the output device 525 can be a user interface. The input/output controller 524 may also be configured to receive and process an input from one or more input devices 526, for example, a keyboard, a microphone, or a touchpad. In some examples, the one or more input devices 526 is an input reception module. In one example, the output device 525 may also act as the input device. An example of such a device may be a touch sensitive display that functions as both the input/output controller 524. The input/output controller 524 may also output data to devices other than the output device, e.g., a locally connected printing device. In some examples, a user may provide input to the input device(s) 526 and/or receive output from the output device(s) 525.

The functionality described herein can be performed, at least in part, by one or more hardware logic components. According to an example, the computing apparatus 518 is configured by the program code when executed by the processor 819 to execute the examples of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an example computing device, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

In examples involving a general-purpose computer, aspects of the disclosure transform the general-purpose computer into a special-purpose computing device when configured to execute the instructions described herein.

An example computer-implemented method for adjusting resources during execution of a query includes receiving a query; identifying a plurality of tasks to execute the query, the plurality of tasks comprising a first task and a second task that depends from the first task; providing a first estimation of a first amount of resources to be used to execute the first task; providing a second estimation of a second amount of resources to be used to execute the second task; based at least on the first estimation and the second estimation, assigning the first task to a first node and the second task to a second node; and prior to the second task on the second node being executed: receiving, from the first node, an actual amount of resources used to execute the first task; and based at least on the actual amount of the resources used to execute the first task, adjusting the second estimation of the second amount of resources to be used to execute the second task.

An example system for adjusting resources during execution of a query includes a distributed query processor; a query optimizer; a cluster of nodes, the cluster of nodes comprising a first node and a second node; a memory comprising computer-readable media that, when executed by the distributed query processor, cause the distributed query processor to perform the following operations: receiving a query; identifying a plurality of tasks to execute the query, the plurality of tasks comprising a first task and a second task that depends from the first task; receiving, from the query optimizer, a first estimation of a first amount of resources to be used to execute the first task; receiving, from the query optimizer, a second estimation of a second amount of resources to be used to execute the second task; based at least on the first estimation and the second estimation, assigning the first task to the first node and the second task to the second node; and prior to the second task on the second node being executed: receiving, from the first node, an actual amount of resources used to execute the first task; and based at least on the actual amount of the resources used to execute the first task, adjusting the second estimation of the second amount of resources to be used to execute the second task.

An example computer-readable media comprising computer-executable instructions that, when executed by a processor, cause the processor to perform the following operations: receiving a query; identifying a plurality of tasks to execute the query, the plurality of tasks comprising a first task and a second task that depends from the first task; providing a first estimation of a first amount of resources to be used to execute the first task; providing a second estimation of a second amount of resources to be used to execute the second task; based at least on the first estimation and the second estimation, assigning the first task to a first node and the second task to a second node; and prior to the second task on the second node being executed: receiving, from the first node, an actual amount of resources used to execute the first task; and based at least on the actual amount of the resources used to execute the first task, adjusting the second estimation of the second amount of resources to be used to execute the second task.

Alternatively, or in addition to the other examples described herein, examples include any combination of the following:
 wherein the actual amount of resources used to execute the first task is different than the first estimation of the first amount of resources;
 wherein adjusting the second estimation of the second amount of resources comprises one of the following: increasing the second amount of resources in the second estimation when the actual amount of resources used to execute the first task is greater than the first estimation of the first amount of resources, or decreasing the second amount of resources in the second estimation when the actual amount of resources used to execute the first task is less than the first estimation of the first amount of resources;

wherein each task in the plurality of tasks has a resource demand comprising: a central processing unit demand, a memory demand, and a disk demand;

wherein each of the first node and the second node have a resource capacity comprising: a central processing unit capacity, a memory capacity, and a disk cost capacity;

wherein assigning the first task to the first node and the second task to the second node is based at least on the resource demand of each of the first task and the second task and the resource capacity of the first node and the second node;

further comprising identifying a degree of parallelism for the first task, the degree of parallelism indicating how many different nodes the first task can be executed on; and based on the identifying, assigning the first task to the first node or assigning the first task to the first node and one or more other nodes; and wherein the actual amount of resources used to execute the first task is received in real-time from the first node using a dedicated communication channel.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The invention claimed is:

1. A method comprising:

receiving a query;

identifying a plurality of tasks to execute the query, the plurality of tasks comprising a first task and a second task that depends from the first task;

providing a first estimation of a first amount of resources to be used to execute the first task;

providing a second estimation of a second amount of resources to be used to execute the second task;

based at least on the first estimation and the second estimation, assigning the first task to a first plurality of nodes and the second task to a second plurality of nodes; and prior to the second task on the second plurality of nodes being executed:

receiving, from the first plurality of nodes, an actual amount of resources used to execute the first task; and based at least on the actual amount of the resources used to execute the first task, adjusting the second estimation of the second amount of resources to be used to execute the second task by increasing an estimated amount of resources on a first node and a second node in the second plurality of nodes, wherein the estimated amount of resources for the first node is increased by a number greater than the estimated amount of resources for the second node is increased.

2. The method according to claim 1, wherein the actual amount of resources used to execute the first task is different than the first estimation of the first amount of resources.

3. The method according to claim 1, wherein adjusting the second estimation of the second amount of resources comprises one of the following: increasing the second amount of resources in the second estimation when the actual amount of resources used to execute the first task is greater than the first estimation of the first amount of resources, or decreasing the second amount of resources in the second estimation when the actual amount of resources used to execute the first task is less than the first estimation of the first amount of resources.

4. The method according to claim 1, wherein each task in the plurality of tasks has a resource demand comprising: a central processing unit demand, a memory demand, and a disk demand.

5. The method according to claim 4, wherein each node in the first plurality of nodes and each node in the second plurality of nodes have a resource capacity comprising: a central processing unit capacity, a memory capacity, and a disk cost capacity; and wherein assigning the first task to the first plurality of nodes and the second task to the second plurality of nodes is based at least on the resource demand of each of the first task and the second task and the resource capacity of each node in the first plurality of nodes and each node in the second plurality of nodes.

6. The method according to claim 1, further comprising:
identifying a degree of parallelism for the first task, the degree of parallelism indicating how many different nodes the first task can be executed on; and
based on the identifying, assigning the first task to the first plurality of nodes.

7. The method according to claim 1, wherein the actual amount of resources used to execute the first task is received in real-time from the first node using a dedicated communication channel.

8. A system comprising:
a distributed query processor;
a query optimizer;
a cluster of nodes; and
a memory comprising computer-readable media that, when executed by the distributed query processor, cause the distributed query processor to perform the following operations:
receiving a query;
identifying a plurality of tasks to execute the query, the plurality of tasks comprising a first task and a second task that depends from the first task;
receiving, from the query optimizer, a first estimation of a first amount of resources to be used to execute the first task;
receiving, from the query optimizer, a second estimation of a second amount of resources to be used to execute the second task;
based at least on the first estimation and the second estimation, assigning the first task to a first plurality of nodes in the cluster of nodes and the second task to a second plurality of nodes in the cluster nodes; and
prior to the second task on the second plurality of nodes being executed:
receiving, from the first plurality of nodes, an actual amount of resources used to execute the first task; and
based at least on the actual amount of the resources used to execute the first task, adjusting the second estimation of the second amount of resources to be used to execute the second task by increasing an estimated amount of resources on a first node and a second node in the second plurality of nodes, wherein the estimated amount of resources for the first node is increased by a number greater than the estimated amount of resources for the second node is increased.

9. The system of claim 8, wherein the actual amount of resources used to execute the first task is different than the first estimation of the first amount of resources.

10. The system of claim 8, wherein adjusting the second estimation of the second amount of resources comprises one of the following: increasing the second amount of resources in the second estimation when the actual amount of resources used to execute the first task is greater than the first estimation of the first amount of resources, or decreasing the second amount of resources in the second estimation when the actual amount of resources used to execute the first task is less than the first estimation of the first amount of resources.

11. The system of claim 8, wherein each task in the plurality of tasks has a resource demand comprising: a central processing unit demand, a memory demand, and a disk demand.

12. The system of claim 11, wherein each node in the first plurality of nodes and each node in the second plurality of nodes have a resource capacity comprising: a central processing unit capacity, a memory capacity, and a disk cost capacity; and
wherein assigning the first task to the first plurality of nodes and the second task to the second plurality of nodes is based at least on the resource demand of each of the first task and the second task and the resource capacity of each node in the first plurality of nodes and each node in the second plurality of nodes.

13. The system of claim 8, wherein the computer-readable media further causes the distributed query processor to perform the following operations:
identifying a degree of parallelism for the first task, the degree of parallelism indicating how many different nodes the first task can be executed on; and
based on the identifying, assigning the first task to the plurality of nodes.

14. The system of claim 8, further comprising:
a first dedicated communication channel coupled between the distributed query processor and the first node; and
a second dedicated communication channel coupled between the distributed query processor and the second node,
wherein the actual amount of resources used to execute the first task is received in real-time from the first node using the first dedicated communication channel.

15. One or more computer storage media comprising computer-executable instruction that, when executed by a processor, cause the processor to perform the following operations:
receiving a query;
identifying a plurality of tasks to execute the query, the plurality of tasks comprising a first task and a second task that depends from the first task;
providing a first estimation of a first amount of resources to be used to execute the first task;
providing a second estimation of a second amount of resources to be used to execute the second task;
based at least on the first estimation and the second estimation, assigning the first task to a first plurality of nodes and the second task to a second plurality of nodes; and
prior to the second task on the second plurality of nodes being executed:
receiving, from the first plurality of nodes, an actual amount of resources used to execute the first task; and
based at least on the actual amount of the resources used to execute the first task, adjusting the second estimation of the second amount of resources to be used to execute the second task by increasing an estimated amount of resources on a first node and a second node in the second plurality of nodes, wherein the estimated amount of resources for the first node is increased by a number greater than the estimated amount of resources for the second node is increased.

16. The one or more computer storage media of claim 15, wherein the actual amount of resources used to execute the first task is different than the first estimation of the first amount of resources.

17. The one or more computer storage media of claim 15, wherein adjusting the second estimation of the second amount of resources comprises one of the following: increasing the second amount of resources in the second estimation when the actual amount of resources used to execute the first task is greater than the first estimation of the first amount of resources, or decreasing the second amount of resources in the second estimation when the actual amount of resources used to execute the first task is less than the first estimation of the first amount of resources.

18. The one or more computer storage media of claim 15, wherein each task in the plurality of tasks has a resource demand comprising: a central processing unit demand, a memory demand, and a disk demand.

19. The one or more computer storage media of claim 18, wherein each node in the first plurality of nodes and each node in the second plurality of nodes have a resource capacity comprising: a central processing unit capacity, a memory capacity, and a disk cost capacity; and
    wherein assigning the first task to the first plurality of nodes and the second task to the second plurality of nodes is based at least on the resource demand of each of the first task and the second task and the resource capacity of each node in the first plurality of nodes and each node in the second plurality of nodes.

20. The one or more computer storage media of claim 15, wherein the computer-executable instructions further cause the processor to perform the following operations:
    identifying a degree of parallelism for the first task, the degree of parallelism indicating how many different nodes the first task can be executed on; and
    based on the identifying, assigning the first task to the first plurality of nodes.

\* \* \* \* \*